Figure 3:
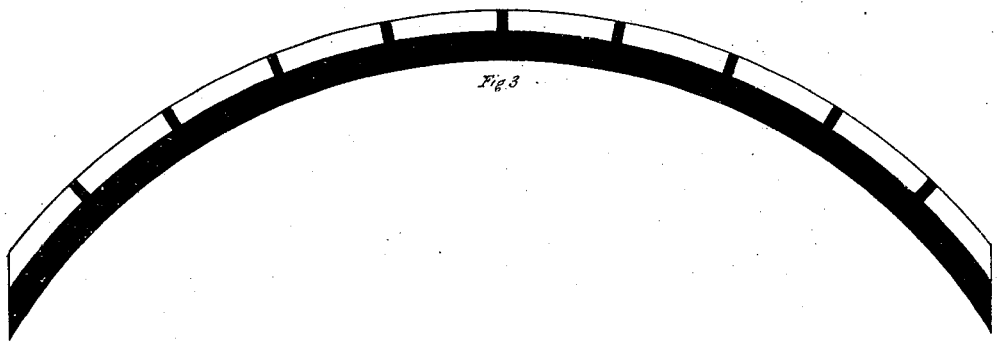
Figure 2:
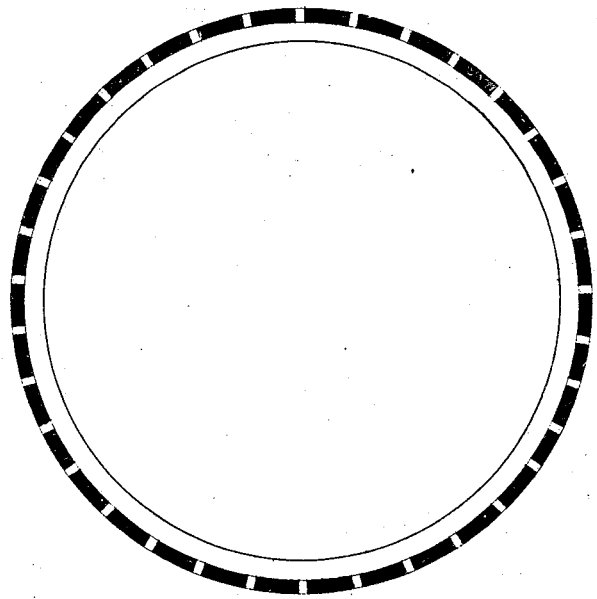
Figure 1:
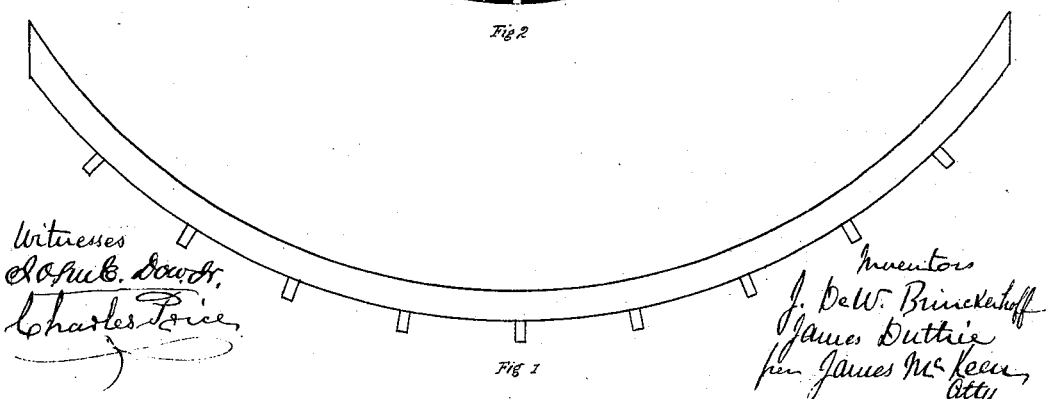

Brinckerhoff & Duthie,
Construction of Globes.
No. 109,581.  Patented Nov. 29, 1870.

United States Patent Office.

JOHN DE WITT BRINCKERHOFF AND JAMES DUTHIE, OF MORRISANIA, NEW YORK.

Letters Patent No. 109,581, dated November 29, 1870.

IMPROVEMENT IN THE CONSTRUCTION OF GLOBES, MAPS, &c., FOR SCHOOLS.

The Schedule referred to in these Letters Patent and making part of the same.

*To all whom it may concern:*

Be it known that we, JOHN DE WITT BRINCKERHOFF and JAMES DUTHIE, of Morrisania, in the county of Westchester and State of New York, have invented a new and improved Method of Making Globes, Maps, and Charts; and we do hereby declare that the following is a full and exact description thereof, reference being had to the accompanying specimen.

The nature of our invention consists in the construction of globes, maps, and charts, with lines and configurations inlaid in the surface thereof, so that the same are not erased in erasing drawings upon the surface thereof.

To enable others skilled in the art to make and use our invention, we will proceed to describe the construction.

We construct a globe by first making a cage or skeleton of wood, formed by a series of concentric rings, diminishing in diameter from the equator to the poles, which are covered with thin cliptical laths.

Through the center of these rings is a shaft or axis, the ends supported by proper bearings or boxes, in such a manner that the whole may be turned by a crank.

A turn-plate of the required radius is leveled opposite the exact center of the shaft, and by turning the crank a globe is struck corresponding to the size of the turn-plate by covering the aforesaid cage or skeleton with any plastic material suitable for the purpose.

When dry and hard the surface is painted with several coatings of a mixture composed of ocher and Japan, and then rubbed smooth.

The lines and configurations are then traced in pencil, and afterward raised on the surface by using a pen or pipette made of a glass tube drawn to a point and terminating in a small orifice. To this is attached a gum tube with a mouth-piece.

The glass tube being filled with a plastic material of the proper consistence, as gellatine, or gum in solution mixed with zinc white, Paris white, &c., it is held in the hand as a pen or pencil, the mouth is applied to the gum tube, and the lines are raised by forcing the material out of the orifice of the glass-tube, retracing those lines previously made.

In this manner all the lines that are required are raised on the surface of the globe.

This is then used as a model, from which molds are taken, which are employed to reproduce or multiply globes in any number.

To complete a globe in this state for use, it is covered with a preparation composed of Japan or boiled oil, or other suitable material, mixed with turpentine oil, or other volatile fluid, and tempered with flour of emery, or other pulverous earthy matter, and colored with any dark-colored pigment, which, on the evaporation of the volatile portion, leaves the surface in a condition to be written upon with a slate-pencil or other substance such as that. Lines so made can be erased.

The raised lines are then planed down to the surface, and the result is a globe having a dark ground with white lines permanently inlaid or imbedded in its surface, and forming a constituent part of the body of the globe itself, and which are incapable of erasure or wearing down by the friction incident to rubbing off the erasible lines made by the pencil, as in illustrating school lessons.

Maps and charts with a surface that may be drawn upon, and having thereon the outlines of geographical divisions of the earth, for the use of learners in schools, &c., are made by the same process.

A white-surfaced globe with dark lines may be made by reversing the process; that is, by making the first surface and lines of a dark color, and the second in white.

What we claim as our invention, and desire to secure by Letters Patent, is—

The production of globes, maps, or charts having a surface with the configurations and lines inlaid or imbedded therein, by the process described or any other substantially the same.

JOHN DE WITT BRINCKERHOFF.
JAMES DUTHIE.

Witnesses:
CHAUNCEY SMITH,
JAMES McKEEN.